US008537990B2

(12) United States Patent
Rudman

(10) Patent No.: US 8,537,990 B2
(45) Date of Patent: Sep. 17, 2013

(54) COMMUNICATIONS DEVICE AND METHOD AND METHOD OF USE

(76) Inventor: Frederic Rudman, East Chatham, NY (US)

( * ) Notice: Subject to any disclaimer, the term of this patent is extended or adjusted under 35 U.S.C. 154(b) by 178 days.

(21) Appl. No.: 12/949,845

(22) Filed: Nov. 19, 2010

(65) Prior Publication Data

US 2012/0128143 A1    May 24, 2012

(51) Int. Cl.
*H04B 1/00*    (2006.01)
*H04M 11/04*    (2006.01)

(52) U.S. Cl.
USPC ............ 379/110.01; 379/38; 379/41; 379/42; 340/540

(58) Field of Classification Search
USPC .............. 379/38, 42, 51, 93.09, 93.11, 93.17, 379/100.02, 100.05, 100.12, 102.01, 102.02, 379/102.05, 106.05, 110.01, 32.01, 41, 69, 379/74, 85; 340/540
See application file for complete search history.

(56) References Cited

U.S. PATENT DOCUMENTS

| | | | |
|---|---|---|---|
| 4,747,129 | A | 5/1988 | Ostrowiecki |
| D312,457 | S | 11/1990 | Inatomi |
| 4,991,199 | A | 2/1991 | Parekh et al. |
| 5,008,927 | A | 4/1991 | Weiss et al. |
| 5,195,130 | A | 3/1993 | Weiss et al. |
| 5,222,127 | A * | 6/1993 | Fukui ............................ 379/131 |
| 5,307,263 | A | 4/1994 | Brown |
| 5,369,700 | A | 11/1994 | Koura et al. |
| 5,467,773 | A | 11/1995 | Bergelson et al. |
| 5,572,572 | A | 11/1996 | Kawan |
| 5,573,506 | A | 11/1996 | Vasko |
| 5,601,435 | A | 2/1997 | Quy |
| 5,657,378 | A | 8/1997 | Haddock et al. |
| 5,678,562 | A | 10/1997 | Sellers |

(Continued)

FOREIGN PATENT DOCUMENTS

JP    9022495    1/1997

OTHER PUBLICATIONS

International Search Report and the Written Opinion dated Mar. 2, 2012; PCT/US11/61120; International File Date: Nov. 17, 2011; Applicant: Rudman, Frederic; 14 pages.

*Primary Examiner* — Binh Tieu
(74) *Attorney, Agent, or Firm* — Schmeiser, Olsen & Watts, LLP

(57) ABSTRACT

The present disclosure relates to devices and methodologies for assisting caregivers or other interested parties in remotely monitoring elderly individuals living in their homes (i.e. in the elderly individual's homes). The monitoring system includes a communications device comprising a unit largely in the form of a traditional corded desk telephone accessible via the public switched telephone network (PSTN) using Plain Old Telephone Service (POTS) but enhanced with a built-in HTTP/HTTPS web server. The web-server-enhanced telephone resides in the home of the elderly monitored individual and can passively collect various ongoing activity details, or lack thereof, from that individual, such as when calls are made or answered, or not answered, or when loud noises are detected at odd times, such as in the middle of the night. Interested and authorized parties (e.g. caregivers) can subsequently access this information remotely using any standard HTTP/HTTPS-based browser client by connecting to the elderly monitored individual's in-home enhanced telephone's built-in web server. The web-server part of the telephone can then generate and transmit any and all relevant collected activity or other requested information in the form of HTML web pages or other HTTP/HTTPS-compatible media that detail or summarize information relating to collected reports of activities from the elderly monitored individual.

47 Claims, 7 Drawing Sheets

(56) References Cited

U.S. PATENT DOCUMENTS

| | | | |
|---|---|---|---|
| 5,704,364 A | 1/1998 | Saltzstein et al. | |
| D392,946 S | 3/1998 | Elkins | |
| 5,835,577 A | 11/1998 | Disanto et al. | |
| D404,393 S | 1/1999 | Russmann | |
| 5,871,465 A | 2/1999 | Vasko | |
| 5,897,493 A | 4/1999 | Brown | |
| D410,229 S | 5/1999 | Chiocchi | |
| 5,899,855 A | 5/1999 | Brown | |
| 5,913,310 A | 6/1999 | Brown | |
| 5,923,736 A * | 7/1999 | Shachar | 379/93.17 |
| 5,931,791 A | 8/1999 | Saltzstein et al. | |
| 5,933,136 A | 8/1999 | Brown | |
| 5,951,300 A | 9/1999 | Brown | |
| 5,997,476 A | 12/1999 | Brown | |
| 6,014,432 A | 1/2000 | Modney | |
| 6,032,119 A | 2/2000 | Brown et al. | |
| 6,101,478 A | 8/2000 | Brown | |
| 6,121,958 A | 9/2000 | Clark et al. | |
| 6,122,351 A | 9/2000 | Schlueter, Jr. et al. | |
| 6,167,386 A | 12/2000 | Brown | |
| 6,168,563 B1 | 1/2001 | Brown | |
| 6,210,272 B1 | 4/2001 | Brown | |
| 6,219,408 B1 | 4/2001 | Kurth | |
| 6,228,057 B1 | 5/2001 | Vasko | |
| 6,270,455 B1 | 8/2001 | Brown | |
| 6,292,698 B1 | 9/2001 | Duffin et al. | |
| 6,355,018 B1 | 3/2002 | Vasko | |
| 6,368,273 B1 | 4/2002 | Brown | |
| 6,375,469 B1 | 4/2002 | Brown | |
| 6,398,727 B1 | 6/2002 | Bui et al. | |
| 6,449,269 B1 * | 9/2002 | Edholm | 370/352 |
| 6,463,299 B1 | 10/2002 | Macor | |
| 6,579,231 B1 | 6/2003 | Phipps | |
| 6,748,061 B2 * | 6/2004 | Ahlstrom et al. | 379/102.06 |
| 6,876,648 B1 * | 4/2005 | Lee | 370/353 |
| 6,891,936 B2 | 5/2005 | Kai et al. | |
| D511,761 S | 11/2005 | Robinson | |
| 6,980,112 B2 | 12/2005 | Nee | |
| 7,061,897 B2 | 6/2006 | Theimer | |
| 7,062,291 B2 * | 6/2006 | Ryley et al. | 455/556.1 |
| 7,130,396 B2 | 10/2006 | Rogers et al. | |
| 7,299,085 B2 | 11/2007 | Bergelson et al. | |
| 7,382,247 B2 | 6/2008 | Welch et al. | |
| 7,424,543 B2 | 9/2008 | Rice, III | |
| 7,664,083 B1 | 2/2010 | Cermak et al. | |
| 7,958,201 B2 * | 6/2011 | Lindsay | 709/217 |
| 2003/0009088 A1 | 1/2003 | Korth et al. | |
| 2004/0213384 A1 * | 10/2004 | Alles et al. | 379/70 |
| 2004/0246946 A1 * | 12/2004 | Nelson et al. | 370/352 |
| 2005/0010656 A1 * | 1/2005 | Lee | 709/223 |
| 2005/0101841 A9 | 5/2005 | Kaylor et al. | |
| 2005/0278409 A1 * | 12/2005 | Kutzik et al. | 709/200 |
| 2007/0265533 A1 | 11/2007 | Tran | |
| 2008/0081610 A1 | 4/2008 | Bhalla | |
| 2008/0084298 A1 * | 4/2008 | King | 340/540 |
| 2008/0091175 A1 * | 4/2008 | Frikart et al. | 604/891.1 |
| 2009/0022293 A1 | 1/2009 | Routt | |
| 2009/0074161 A1 | 3/2009 | Kamiya | |
| 2009/0082008 A1 * | 3/2009 | Thorell | 455/423 |
| 2010/0070566 A1 * | 3/2010 | Vandewalle | 709/203 |
| 2010/0322082 A1 * | 12/2010 | Roden et al. | 370/242 |
| 2011/0237905 A1 * | 9/2011 | Kutzik et al. | 600/300 |
| 2011/0294490 A1 * | 12/2011 | Faenger | 455/419 |

\* cited by examiner

COMMUNICATIONS DEVICE AND METHOD AND METHOD OF USE

BACKGROUND

This disclosure relates to a communications device and methods for monitoring elderly individuals from a distance and a method of using the communications device.

There is a very large (and growing) segment of the World's population that is aging (i.e. over 65, 75, or 85 years of age) that are healthy enough to live independently, at least part of the time, but who need some minimal form of care, monitoring, and assistance in order to remain independent i.e. live in their own home. Such minimal monitoring by interested caregivers/parties (hereinafter "caregivers") can mean the difference between the elderly staying in their familiar home environment or having to move away out of their home and into some unfamiliar caregiving facility for the elderly (such as a nursing home), a very unpleasant and unwelcome alternative for the elderly individual and, usually, an extremely costly one for the elderly individual's family footing the bills.

This minimal level of care giving and monitoring is often done by informal (i.e. non-professional) caregivers, usually the monitored individuals' own grown children or other family friends or relatives. These caregivers may live with the elderly individuals but be away from the home regularly or for long periods of time, such as when going to work every day. These caregivers may also live in another house, another city, or even another country where regular daily contact with their elderly parent is minimal or non-existent. These informal caregivers often have day jobs of their own, as well as children of their own (hence the term the "Sandwich Generation"), and often have little or no financial means to monitor their elderly parents while away (for example, while at work). This makes the task of monitoring and caring for the elderly individuals very burdensome and getting more difficult and costlier as the elderly individual ages.

The elderly individuals themselves can be alone (completely, or at least part of the day while their informal caregivers are away at work, for example) and may also live with their spouse or partner or friends, usually also elderly and with possibly similar memory or health deficiencies and so similar needs for at least some monitoring and caring.

There are many devices on the market that serve to monitor such elderly individuals living independently who may have some memory and/or health issues. These devices, however, all require adaptation on the part of the elderly either in the form of behavioral changes or in the form of modifications to the elderly individual's home.

Extensive research has shown that ANY required behavior modification on the part of an elderly individual is a losing proposition, as most elderly individuals stop comfortably changing their daily lifestyle behavior after the age of 60 and even start reverting back to behaviors they may have had even decades earlier (hence the very well-known difficulties most elderly individuals have with "new" technologies in general, such as computers). This is unfortunate since a lot of remote monitoring could be easily accomplished by personal computers and associated peripherals and accessories yet this is the very technology likely to be rejected by many elderly individuals.

The challenge of the caregivers therefore is in how to introduce an end-point "beachhead of technology" (i.e. advanced computer based technology) into the home of the elderly individual without creating a negative or adverse reaction from that individual. If such advanced endpoint devices are installed in the monitored individuals' home, caregivers could then access the various status information from the other end point of this "virtual communications pipeline" (e.g. via remote browser capable computer or device) to effectively monitor their elderly ward.

A simple example of forcible behavioral modification from the elderly is for those systems that require the elderly to wear some device (e.g. an alert button to be pressed when in trouble or a watch that tracks their movement via GPS signals). While effective in some cases, there are many situations where these devices are ineffective because the elderly individual forgot to wear that device (common since elderly often have memory issues and wearing a "safety pendant" is a change in behavior for that individual), forgot to activate it when needed (again, because they simply forgot they had such a device), or simply was incapable of activating it (e.g. after falling in the bathroom and breaking a bone, or becoming unconscious, a very common scenario). Another serious limitation of such devices is that they are only useful in extreme cases (i.e. something bad happened) and convey no other information to the caregivers needing to take some actions. Finally, many elderly individuals regard these types of devices as intrusive and consider them, negatively, "badges of dependencies," these devices reminding them daily of their failing health and the need for help from others, an unpleasant and demeaning concept for most.

More recent development in the field of elderly individual monitoring goes the other direction, namely to modify the home in which the elderly individual resides and reduce (though not eliminate) the need for the elderly individuals to change their lifelong-acquired day-to-day living habits.

Such modifications include installation of, for example, motion detectors, temperature and humidity sensors, even discreet cameras dispersed throughout the elderly individual's living spaces. These have shown to be much better at helping caregivers monitor elderly individuals and many elderly individuals welcome this more discreet brand of monitoring, something they see as a positive safety blanket, that keeps an eye on them.

But these systems have many drawbacks as well. The first big problem for many is the effort and expense needed in installing such systems (including labor costs and equipment costs, as well as construction issues to homes). Further, these systems are often NOT available to those families whose [to-be] monitored elderly individuals live in, for example, rented apartments where physical modifications to the structure are not possible or allowed. And most of these systems are made available through a third party, usually a professional medically-backed service that requires expensive ongoing fees for the monitoring of the individuals.

The biggest barrier for such systems is often that many elderly individuals still regard this type of monitoring as very intrusive and an extreme invasion of their privacy (the Big Brother syndrome). This fear of invasion of privacy is further compounded by the fact that all these current systems involve overtly keeping tabs and collecting various records on the elderly individual's daily activities and then TRANSMITTING this information to be stored on remote servers (where it can presumably be compiled and analyzed by various services looking for abnormalities in the elderly individual's behavior, thus triggering alerts if required) thereby putting access to this very personal information outside of the control of the individual or their caregivers.

But this transmission of VERY private information to some remote server has very serious implications in a world where corporate servers get hacked regularly and often, and where individuals' private records (such as personal health records, credit cards, and banking information) are then used for countless fraudulent activities.

For example, U.S. Pat. No. 7,382,247 to Welch et al. discloses a system for actively monitoring a patient including at least one body-worn monitoring device that has at least one sensor capable of measuring at least one physiologic parameter and detecting at least one predetermined event. At least one intermediary device is, linked to the body-worn monitoring device by means of a first wireless network and at least one respondent device is linked to said at least one intermediary device by a second wireless network wherein the respondent device is programmed to perform a specified function automatically when the at least one predetermined event is realized. The monitoring device operates to periodically transmit patient status data to the intermediary device but the system predominantly operates in a quiet state, providing very low power consumption.

U.S. Pat. No. 7,130,396 to Rogers et al. discloses a medical monitoring system having a sensor system including a sensor associated with a patient and a lifestyle unit. The lifestyle unit includes a microprocessor in communication with the sensor system, and a portable-monitoring unit transceiver system in communication with the microprocessor. The portable-monitoring unit transceiver system has a land-line telephone transceiver and/or a cellular telephone transceiver, and a third-network transceiver such as a paging-network transceiver. A full data set is transmitted over the land-line telephone transceiver or the cellular telephone transceiver when communication links over these transceivers are available, and a reduced data set is transmitted over the third-network transceiver when communications links over the land-line telephone transceiver and the cellular telephone transceiver are not available.

U.S. Pat. No. 6,579,231 to Phipps discloses a portable unit worn by a subject, comprising a medical monitoring device, a data processing module with memory and transmitter for collecting, monitoring, and storing the subject's physiological data and also issuing the subject's medical alarm conditions via wireless communications network to the appropriate location for expeditious dispatch of assistance. The unit also works in conjunction with a central reporting system for long term collection and storage of the subject's physiological data. The unit may have the capability to automatically dispense chemicals that may alleviate or assist in recovery from an illness.

Though very useful for monitoring sick individuals, in particular geriatric individuals who live alone, these devices intrude into the individual's lives by requiring them to wear a monitor at all times or otherwise effectuate changes to their daily habits. These devices are often considered too intrusive to be used by these individuals who live alone, but are in good enough health that they may not require institutionalized care, such as an older individual living away from family and/or other interested parties.

The above are also examples of technology that has generally been developed to monitor more acute or critically ill, hospitalized or institutionalized individuals. There are many technological systems that take care of the gravely ill, the invalids and so forth.

All the above technologies also focus primarily or exclusively on the "Health Care" of the individual, where regular usage of those systems also become a constant reminder of their failing health, creating and often REINFORCING a very negative attitude toward the technology meant to help them. This negative reinforcing cycle leads to a reduced use of the very technology that can help them remain independent. Often, because of this negatively reinforcing cycle, the monitored individuals stop using those technologies altogether, to their and their caregivers' detriment.

However, in situations where individuals are not gravely ill, invalid or otherwise incapable of caring for themselves but may require some unobtrusive and passive monitoring of their activities, there is believed to currently be a lack of technology of a "Do It Yourself" nature for people, very much capable of living fairly independently but for whom some monitoring may be necessary and where behavior modification for that individual is a non-starter, especially when such monitoring would require "new technologies" to be introduced into their lives.

In that regard, technology needs to be developed and introduced to the older population in order to assist informal remote caregivers to monitor their activities unobtrusively to ensure that the monitored individuals are performing everyday activities, such as taking their medications or going grocery shopping. Remote interested parties may include, but are not limited to, their children or close relatives or others that care about them, collectively known as informal care givers or interested parties.

Minimal characteristics of such a technology must include the following: 1) Absolutely NO behavior modification on the part of the elderly individual. 2) Absolutely NO physical modification required to the home or living space of the elderly individual. 3) Absolutely NO transmission of private information (e.g. daily activities) to remote server (unless, of course, explicitly authorized by the individual and/or their authorized care givers). 4) Network connectivity (if necessary) can be established via a simple PSTN connection (a lot of homes may have Internet access, via Broadband DSL for example, but a large number of homes (especially those in which elderly individuals exclusively reside) still do not have always-on broadband access) and not require an explicit broadband connection to that home. 5) A physical form and presentation of the incarnation of the device which reinforces positive connotations when using the device resulting in increased usage rather than ultimate abandonment of the technology (the device must be presented NOT as a health tool or monitoring device but rather as a LIFESTYLE ENHANCING device). 6) A presentation of the device and usage (i.e. its "packaging") which emphasizes this enhancement to their lifestyle rather than "health care monitoring" to the elderly individual (e.g. a familiar general purpose device that may "incidentally" support a remote caregiver's need to passively monitor the elderly individual). 7) A physical means to protect any information stored in that device so that even if the device is compromised, the information is not readily viewable without a proper key (hardware or software) even if the device is physically stolen. 8) An always ON device that can be used to detect motion and/or other suspicious activities (or lack thereof) such as loud sounds in the middle of the night and that can then proactively initiate a series of pre-programmed actions such as dialing out for help on behalf of the monitored individual.

In short, for elderly individuals, any device is explicitly "modern" or that overtly monitors them will often be rejected by them. To be accepted, such a device would therefore need to be unobtrusive, familiar, comfortable and easy to use (i.e. require no behavior modification or learning or adaptation) and offer value-added functionality that will be viewed by elderly individuals as beneficial from a lifestyle perspective (rather than a healthcare perspective) and so foster growing comfort and increased usage with each interaction of the device.

SUMMARY OF THE DISCLOSURE

The present disclosure may be readily adapted to communications devices and their methods of use. Embodiments of the present disclosure may provide, among other benefits: a non-intrusive end-point device to a communications system that allows a relatively healthy individual to be monitored without having to wear any sort of device or sensor, a way of determining whether or not an individual who may live alone is functioning normally, on a day to day basis, without having to remain in constant contact, and a reminder system for reminding an individual of tasks to be performed or events taking place. Additionally, embodiments of the present disclosure can provide additional features and functionalities that will be non-health related in nature in order to enhance the daily living conditions of the monitored elderly, thus fostering growing comfort when using the device thus encouraging increased usage of the device.

A communications device configured according to an embodiment of the present disclosure may comprise: a traditional-looking corded desktop telephone capable of ringing and having public switched telephone network connectivity, the telephone comprising: a base unit; a handset having a microphone and a speaker operatively positioned therein and being capable of interacting with the base unit; a first cord having two ends, the handset being operatively connected to one of the two ends of the first cord and the other of the two ends being operatively connected to the base unit; and a second cord having two ends, one end being operatively connectable to the base unit and the other end of the second cord being operatively connectable to a public switched telephone network telephone jack; and an HTTP/HTTPS web server operatively resident in the base unit or in the handset.

The base unit may also include a screen large enough to display both health-related and non-health related information, such as photos and images, or videos, or emails, or recipes or otherwise perform as, for example, a picture frame while still looking primarily as a traditional corded desktop telephone.

The base unit or its accompanying handset may also include some form of built-in or integrated alphanumeric keyboard to facilitate interaction with the device in terms of entering information or specifying operational settings, or performing other tasks requiring alphanumeric entry, such as emailing or other incidental alphanumeric interactions with the device.

A communications device for remotely monitoring a monitored individual, the device comprising: a communications device comprising a telephone capable of ringing and having a base unit and a web server operatively positioned in the device; when the telephone rings, the web server records whether or not the telephone was answered by the monitored individual, thereafter the web server can report whether the telephone was answered to a remotely located caregiver; and when a call is initiated on the telephone, the web server records and can report that a call was made on the telephone to a possibly remotely located caregiver.

A method for monitoring a monitored individual comprising: providing a communications device including a telephone capable of sounding a plurality of rings and a web server capable of recording the plurality of rings; determining, utilizing the web server, whether or not the monitored individual used or failed to use the telephone, wherein the use of the telephone comprises answering the telephone or placing a call on the telephone, and the failure to use the telephone comprises not answering the telephone; recording on the web server the use or failure to use the telephone; and ability to report the use or failure to use the telephone to a caregiver.

The foregoing and other features and advantages of the disclosure will be apparent to those of ordinary skill in the art from the following more particular description of the disclosure and the accompanying drawings.

BRIEF DESCRIPTION OF THE DRAWINGS

The disclosure will hereinafter be described in conjunction with the appended drawings where like designations denote like elements, and.

DESCRIPTION OF THE DISCLOSURE

Figure 1:
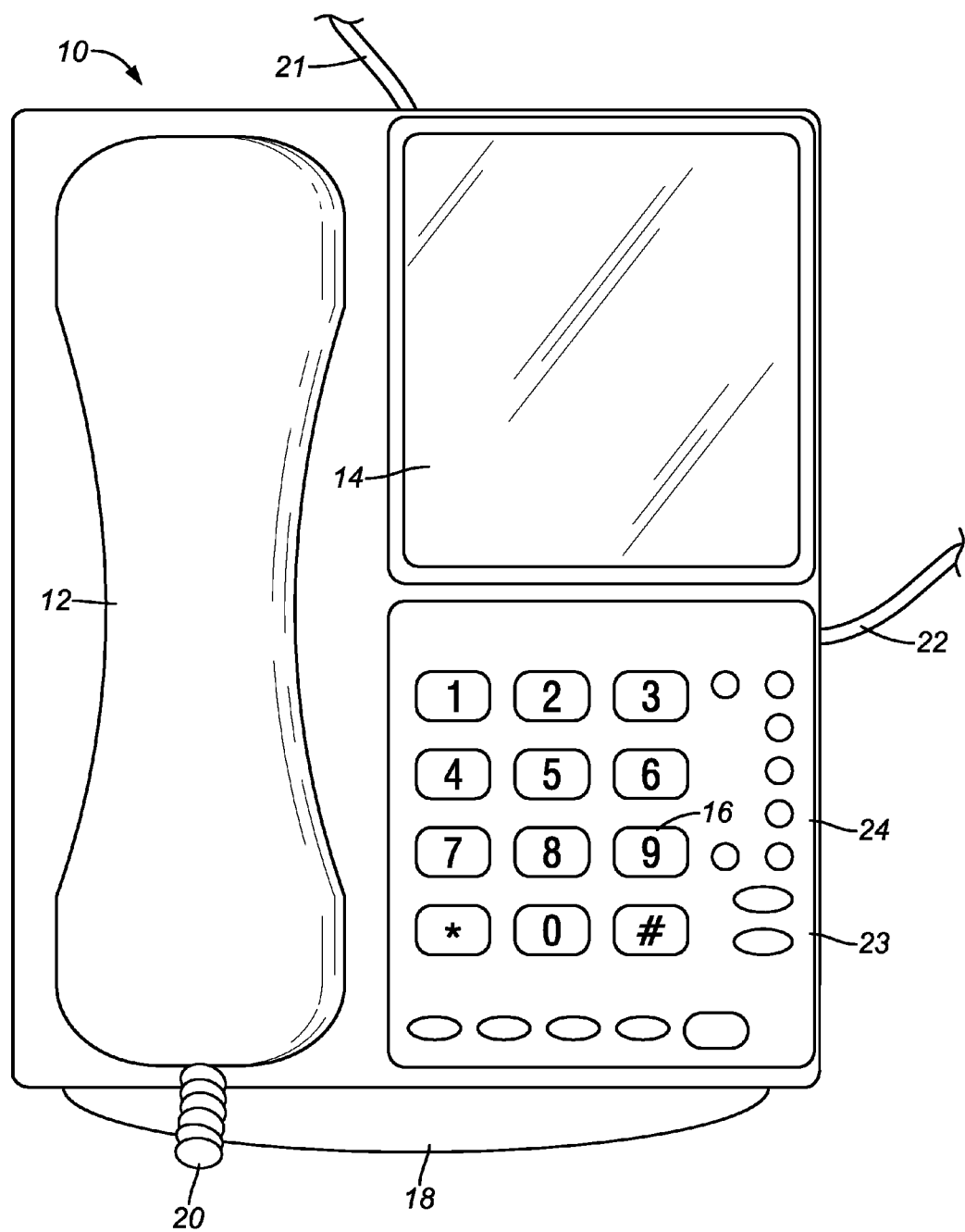
FIG. 1 is a front view of a communications device configured according to an embodiment of the present disclosure with a built-in integrated keyboard kept out of sight for normal operation (in this case a pull-out keyboard that is pushed in)

As has been widely reported, today many older people, as old as 90 or more, are capable of living independently (alone or with others, such as a spouse, partner and or friends) and do not need institutionalized care if some minimal care and monitoring may be made available to them in assisting their often remote caregivers in monitoring the elderly individual's day-to-day activities. More than in past decades, the caregivers (usually the elderly individual's own grown children or other interested parties) and their older parents or loved ones (i.e. the elderly individuals) often live some distance away from each other. And even when living together in the same home, the caregivers may be away for periods of time, such as when away at work during the day. The caregivers need to be able to know certain things about their older parents or loved ones without having to frequently or directly observe them or otherwise have to explicitly interact with them, which may be impossible due to the distance between their residences or their schedule, or have another person more proximate to the older parent, physically check on the older parent. A typical situation is when the caregivers need to be able to determine whether or not the older parent responded to the reminder to take his or her medication, did he or she get up in the morning, and did he or she make or answer telephone calls. All these combined little bits of information tell the remote interested parties that the parent is walking around and that they are alive and generally in good health functioning to their normal level of daily activity.

However, it has been determined by extensive research that older people are often uncomfortable, confused, overwhelmed, even frightened by modern technology (especially computers and cell phones) and prefer to interact with familiar (as in "older" even "much older") communications technology with which they have had a long history of interacting therewith (such as good old fashioned corded desktop telephones). By incorporating advanced server computing technologies (that are easily able to perform basic monitoring tasks for the benefit and on behalf of the caregivers) but "hiding" those technologies inside an otherwise normal-looking outwardly looking corded desktop telephone, this will encourage elderly individuals to use a familiar, comfortable communications device every day such as, for calling their friends, family or other everyday activities, even seeing photos of their grandchildren etc., and such daily usage will result in a positive reinforcement, on a daily basis, rather than have a negative connotation on a daily basis, if the communications device were utilized only as a reminder to take medication, keep appointments etc., i.e. thereby suggesting to them "You are getting old and you need supervision" something distasteful to elderly individuals.

As discussed above, embodiments of the present disclosure relate to a communications device and method for monitoring an individual, including, but not limited to elderly individuals. In particular, a device or method configured according to the present disclosure effectively allows a remotely located caregiver to non-intrusively monitor or otherwise keep tabs on an individual going about in their daily day-to-day activities. Embodiments of the present disclosure also allow all private information concerning an elderly individual or monitored individual, it being understood that the term "monitored individual" can be one or more individuals and not necessarily related individuals, to be and to remain stored locally on an Internet-accessible web server capable of generating HTML operatively positioned in the communications device instead of that same information needing to be stored at a remote location, a possibly less secure situation. As used in this application, the term "web server" means either hardware-implemented or software that runs on a microprocessor or a CPU having a server-capable operating system with accompanying requisite software modules and is capable of minimally generating HTML pages or other forms of browser-consumable media and sending them out over an appropriate network (such as the Internet, an IP network) in response to a request from a browsing client (i.e. a browser, the user agent, or UA) to the server. Specifically, the web server is where the information concerning utilization of the telephone 24 is stored and, in response to a verified, valid request, relevant HTML pages and other media are generated then transmitted to the browser, detailing or summarizing collected or lack of activity.

Figure 2:
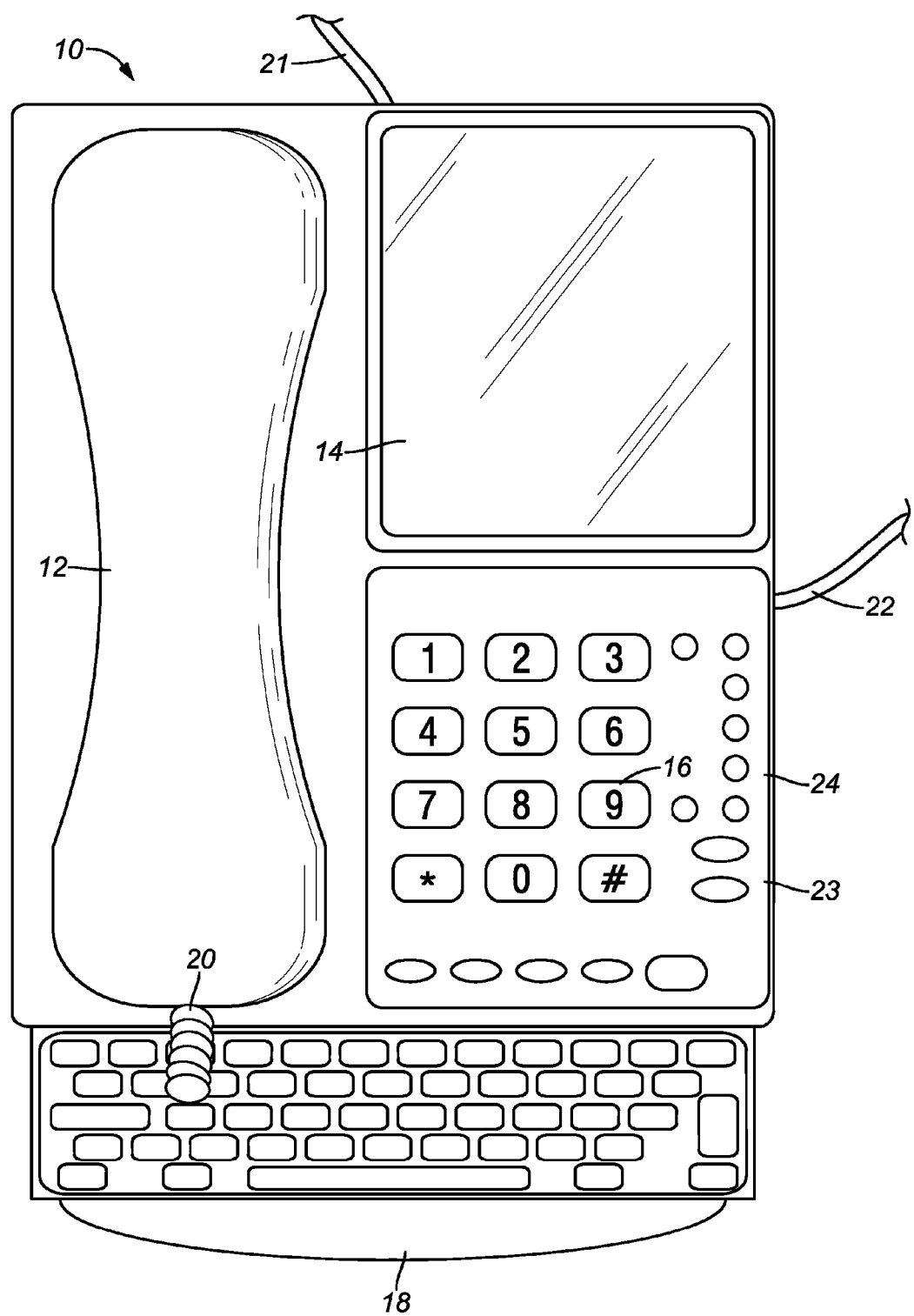
FIG. 2 is a front view of a communications device configured according to an embodiment of the present disclosure with a built-in or integrated keyboard (in this case a pull-out keyboard) pulled out.
Figure 3:
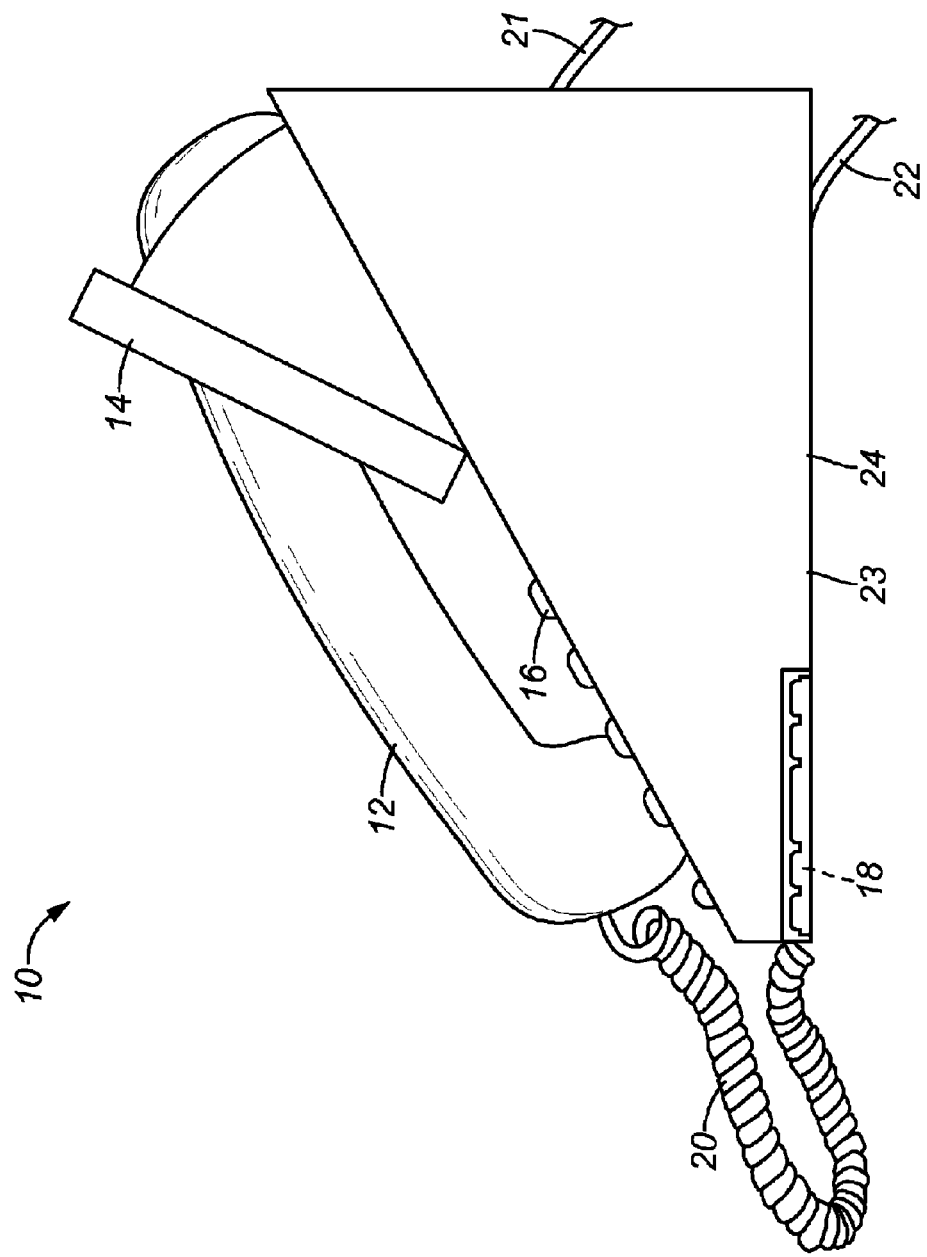
FIG. 3 is a side view of a communications device configured according to an embodiment of the present disclosure with the pull-out keyboard pushed in out of sight; and its tiltable screen tilted up for easier viewing.

FIGS. 1-3 illustrate a communications device 10 configured according to an embodiment of the present disclosure. The communications device 10 comprises the look and shape of a corded telephone 24. A corded telephone 24 may be a telephone that has a handset 12 connected to the telephone's base station 23 by a cord 20. A corded telephone 24 may be desirable in order to instill comfort to the monitored individual (not shown), especially if they are an elderly individual because it's a form that is very familiar to them from decades of prior use of that older technology. A corded telephone 24 also assures a monitoring caregiver that the telephone or its handset will not be misplaced by the monitored individual (such as the case may be with a cordless telephone). Additionally, corded telephones 24 are still operational when normal electric power to the residence experiences a power outage, thereby allowing for emergency use of the telephone (e.g. to call 911) something newer telephones (e.g. cordless telephones) cannot do since they require power to operate. The telephone 24 may be any style of telephone desired capable of operating as a telephone during a power outage. The telephone 24 illustrated in FIGS. 1-3 may be a standard desktop, home or office telephone, however, wall mounted telephones and the like may also be used.

In some embodiments, the telephone 24 (or its attached handset) may also house or comprise a web server 34 (see FIG. 4) for generating and transmitting information from the server, upon request by a remote caregiver, over a plurality of communications networks including, minimally, the PSTN, but other networks as well such as a cellular network, a local wireless network (such as Wi-Fi or Bluetooth®), or cordless network (such as using the DECT protocol). The telephone 24 will be able to dial out or otherwise connect to an IP network, either directly through an IP network (e.g. via a LAN port), or indirectly through the PSTN (e.g. via a modem) or through other means (e.g. via a cellular network) and may also be capable of operating its web server 34 during a power outage, if the telephone 24 has the capability of a backup power source operatively positioned therein or is capable of being operatively connected to an external power source during the power outage. In this regard, PSTN connectivity may be required in order for the communications device 10 to properly function in the event of a power outage. The telephone and its internal web server will be operational at all times except in case of a power failure, in which case only basic telephone features (such as calling and answering incoming calls) will remain operational unless (as stated previously) additional means of power is available (either internal to the telephone or through an external power source such as an Uninterruptible Power Source, a UPS) in which case web server functionality may also remain powered and active.

In another embodiment, the web server 34 may include another cord for connecting the web server 34 directly to an IP network. In operation, the direct connection between the web server 34 and the IP network may be functional at all times except, possibly, during a power outage.

The telephone 24, as depicted in FIGS. 1-3, may be formed from plastic, metal or any other type of material that may withstand regular use and may be relatively inexpensive. In some embodiments, the telephone 24 may be formed in any shape desirable, such as a standard corded home or office telephone as illustrated in the figures, or a novelty telephone such as a character telephone, a lip shaped telephone, an antique telephone, or a car shaped telephone, an animal telephone, or the like. In other embodiments, it may for instance, be desirable to disguise the telephone 24 as an item that that may be familiar to the monitored individual and thus would be non-threatening to an older individual/monitored individual who does not like or feel comfortable with more modern technologies. Specifically, the telephone 24 may be shaped as a device such that older people would easily recognize it as a telephone 24 and NOT as a computing device, a health monitoring device, or a medication reminder, or the like. In this case, a "regular-looking telephone" from the perspective of an elderly individual, is any form that telephones might have taken 10 to 50 years ago rather than what telephones look like today (such as cordless telephones or cellular phones).

A handset 12 may be coupled to the telephone base station 23 through a cord 20. The handset 12 may be simply a standard telephone handset and the handset 12 may be formed from the same material as the rest of the telephone 24 or else it may be formed from any other material which may be lightweight, may withstand frequent use and may be inexpensive. The handset 12 may have the shape of a standard handset as shown, or else it may be other shapes in order to fit with the alternate telephone 24 designs discussed above. For example, if the telephone 24 may be a character telephone, then the handset 12 may be an arm.

The cord 20 by which the handset 12 may be coupled or operably connected to the telephone base station 23 may be any standard telephone cord. A proximal end of the cord 20 may be removably or permanently coupled to the handset 12 while a distal end of the cord 20 may be removably or permanently coupled to the telephone base station 23. A removably coupled cord 20 may be desired in order to allow the cord 20 to be easily replaced if it becomes worn or otherwise needs to be changed. A removable cord 20 may also prevent injuries, such as children getting tangled in the cord 20 or individuals tripping or getting hit with the cord 20 across the neck. In instances where injury may occur, the cord 20 may pull from either the telephone base station 23 or from the handset 12, giving the cord 20 some slack.

The telephone base station 23 may be simply the main part of the telephone 24, not including the handset 12. As described above, this telephone base station 23 may be in the shape of a standard telephone, such as the office telephone shown in the figures, or else it may be part of a character telephone, novelty telephone, car telephone, antique telephone and the like. The telephone base station 23 may also be shaped as any other familiar device and non-threatening device and easily recognizable by to the monitored individual as long as it incorporates a functioning web server.

The telephone base station 23 further comprises a keypad containing keys 16. The keys 16 comprise minimally the numbers 1 through 9, 0, # and the * keys. The keys 16 may also contain specialty keys such as redial, caller ID keys, volume keys, ringer keys, conference call keys, video conference keys, speed dial keys, line keys or the like, and keys to place the telephone in a speaker mode to operate in a hands-free mode. The keys 16 on the telephone base station 23 for the present disclosure may be larger than the keys 16 on a conventional desktop telephone in order to allow an older person/monitored individual to easily see them. The keys 16 may also light up or glow in the dark or otherwise make themselves more easily accessible to the individual.

The communications device 10 may also comprise an audio speaker (not shown) and microphone (both or either one either in the handset or in the base unit or both or otherwise operable in conjunction with the device). The speaker may be a standard speaker used in speaker phones or any other types of speaker, or a plurality or speakers, which may be operable with the communications device 10. The speaker may have sufficient capabilities to allow an older person/monitored individual to easily hear the alarm, the telephone ring and to carry on a conversation with another person utilizing the speaker and microphone. The speaker may be used to play audio books, listen to Internet radio (e.g. streamed from/by the web server), hear videos being played, play games or have video conferences (e.g. with far away family members or doctors or nurses), if an appropriate camera is provided, and the like.

The communications device 10 may also comprise a display screen 14, which may be positionally adjustable. The display screen 14 may be a touch screen and may be physically operatively connected to the handset or the base unit or otherwise functional in conjunction with the telephone. The screen 14 may be a Video Graphics Array (VGA), an LCD, plasma, OLED display screens or any other types of display screens which may be operable with the communications device 10, including standalone screens such as TV screens. The display screen 14 may be of sufficient size for the monitored individual to easily view text or displayed images or other information thereon. The display screen 14 may be used to view photos, such as, for example, photographs of the grandchildren, videos, play games or have video conferences, if an appropriate camera is provided. As a minimum, the screen may be sufficiently large to comfortably display color pictures and videos for elderly individuals/monitored individuals.

The communications device 10 further comprises a built-in and stoweable or otherwise integrated keyboard 18 such that the given keyboard can be hidden within the device when not in use in order to preserve the familiar telephone-like form of the device. The keyboard 18 may be at least a basic QWERTY keyboard with all of the keys on a standard computer keyboard. The keyboard 18, however, may be slightly smaller than a standard keyboard or even not a physical keyboard (such as a laser-projected keyboard onto a flat surface). The keyboard 18 may be mounted on a pull-out tray or simply formed so that it pulls-out from the bottom of the telephone 24 or otherwise toggles in and out (e.g. in a rotational manner) underneath the telephone. The keyboard 18 may also slide out of view under the telephone 24 (see FIG. 1). The integrated keyboard may be directly attached to the telephone (either the base unit or the handset) or attachable to the telephone (either its handset or the base unit), via either wire or wireless means (e.g. Wi-Fi, Bluetooth® or Zigbee®) or any other means to enable alphanumeric input with the telephone, locally or remotely, such as with a light-generated keyboard projection on a flat surface or via HTTP/HTTPS requests through the web server. The keyboard input part, in whichever form offered, and however integrated with the telephone, must be stoweable, retractable, foldable, or otherwise can be kept hidden within the telephone or otherwise out of view for normal operation when alphanumeric input is not needed. The keyboard may be attached or otherwise function when operatively connected to the telephone.

The keyboard 18 may be used to program the web server 34 of the communications device 10 in order to specify the type of information that the caregiver desires to capture. The pull-out keyboard 18 may also be used with applications that may be written for the communications device 10. These applications may include video games, calendars, video display, picture display, web access, reminders, appointments and the like, for example, in response to an alarm.

The communications device 10 may be connected to external peripheral components via one or more ports, such as, USB ports, LAN ports, or one or more wireless protocols, such as, Bluetooth®, Zigbee® and/or WIFI capabilities, or any other protocol or interface. Examples of such external peripherals are video cameras, additional disk drives (such as solid state drives or USB thumb drives), wireless speakers, printers, or televisions or other video monitors.

The communications device 10 may also comprise Bluetooth® capable communications which would allow other devices with Bluetooth® capable communications to communicate with the communications device 10. For example, a blood pressure cuff, scale, or other medical instrument that has Bluetooth® capable communications would be able to communicate its readings to the communications device 10 and this information may then be communicated to the interested parties. The web server of the communications device 10 may also be programmed to proactively inform a remote caregiver if one of the readings is not within a specified parameter. Other wireless protocols may be used in conjunction with or instead of Bluetooth®. Such typical wireless protocols include, but are not limited to, GSM/CDMR (cellular), Wi-Fi, Zigbee® and Bluetooth® (wireless).

The communications device 10 may also have voice recognition. Voice recognition or other security devices may prevent non-authorized individuals or caregivers from accessing the device. Other built-in security components may include, but are not limited to, a smart card (or smartcard reading and writing mechanism), fingerprint recognition, a password or the like in order to prevent the data stored on the web server 34 from being stolen, obviating the need for an off-site storage location where the probability of the information being stolen by computer hackers is considerably higher.

The telephone 24 may be coupled, connected to or interfaces with a cord 22. This cord 22 may be a standard telephone cord. The cord 22 comprises a proximal end which couples to the telephone 24. The proximal end of the cord 22 may be permanently or removably coupled to the telephone 24. A removably coupled cord 22 would allow a monitored individual to replace the cord 22 if it becomes worn or otherwise damaged or inadequate (e.g. not long enough). It would also allow a monitored individual to replace the cord 22 with a different type of cord if necessary. A distal end of the cord 22 may be configured to couple to a Public Switched Telephone Network (PSTN) (e.g. via an RJ 11 telephone jack in the wall). The distal end of the cord 22 may also be configured to couple to any type of jack or outlet available, such as a cable jack, an RJ-45 Ethernet jack or the like. The telephone 24 may also be connected, simultaneously, to other similar or different networks when a plurality of ports or jacks is available.

In order to store information (e.g. obtained while monitoring an individual) the communications device 10 may further comprise a memory device. This memory device may be RAM, CDs, DVDs, a cache, virtual memory or a hard drive, or network-based hard drives or any other form of long-term permanent storage system that does NOT require power to keep its data that can work in conjunction with the telephone.

Figure 4:
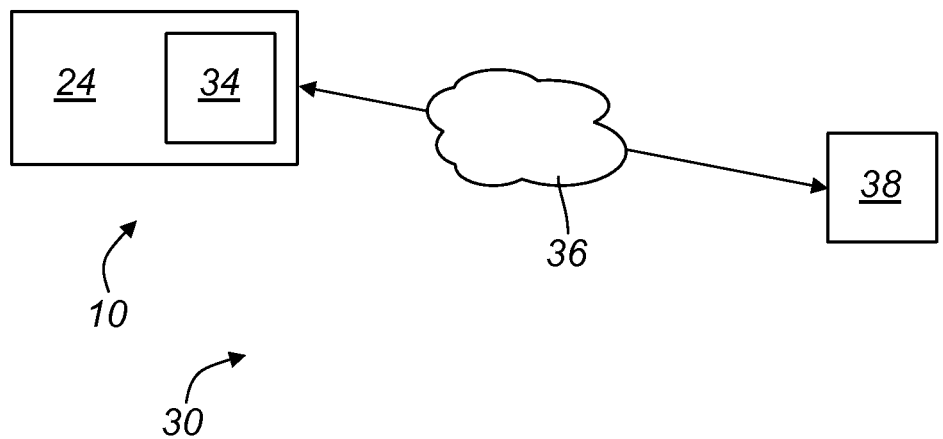
FIG. 4 is a block diagram of the communications pipeline between the caregiver endpoint device (e.g. a PC-based web browser) and the monitored individual endpoint device (i.e. the telephone) configured according to an embodiment of the present disclosure.

FIG. 4 is a block diagram that depicts a communications device 10 configured according to an embodiment of the present disclosure. The communications device 10 may be the type of communications device described above. The communications device 10 comprises a telephone 24. The telephone 24 operates as a standard telephone allowing a monitored individual to make calls and receive calls. The telephone 24 also comprises a web server 34. The web server 34 provides services to other programs or other computers or the monitored individual, either in the same computer or over a computer network. The web server 34 may be used both to locally store information concerning the monitored individual and also to serve this information (later, upon request, such request taking the form of a HTTP/HTTPS command issued from, for example, a remote caregiver using a computer browser) to other computers, servers, or individuals (collectively (38)), either locally or remotely (over an appropriate network 36), using standard HTTP/HTTPS requests and served in the form of HTML pages and other HTTP/HTTPS-compatible media.

The web server 34 may be programmed or communicated with locally through the integrated keyboard operatively connected to the web server 34, or else the web server 34 may be programmed or communicated with over a connected wired or wireless network, such as through an Internet connection, a cell phone or the like. The web server 34 may also recognize voice commands in order to be operated verbally such as via a remote cellphone or over the PSTN. The web server 34 may be operated in such a fashion by the remote caregiver, the monitored individual, an installer, a technical support person or the like.

The communications device 10 may communicate with the remote caregiver 38 or other computer or server in a push or pull mode in a reactive or pro-active basis. Push mode would apply when responding to a request by another computer/server or a caregiver (i.e. reactive). Push mode would also apply in a pro-active basis based upon triggers such as, scheduled information updates. Pull mode would apply when the server is requesting information from a remote server/computer or even a caregiver either in a reactive or proactive mode. The remote caregiver 38 may be anyone who may be concerned about the monitored individual or who receives notices concerning the activity of the monitored individual. For example, the remote caregiver 38 may be a child, spouse, medical practitioner or other concerned individual but that has been explicitly permitted to access the server (such explicit permission being granted by whoever set up the device, or caused it to be set up, in the monitored individual's home). The term remote as used to describe the caregiver may mean that the remote caregiver is located across the world or the country, or it may simply mean next door, on a different floor or in a different room. The remote caregiver 38 may even be someone who lives with the individual, but who goes to work during the day or goes on a trip for vacation and wants to monitor the activity of the monitored individual while away. Therefore, the present disclosure may be used for individuals in all situations of life. It may even be used to monitor a teenager while their parents are away.

The communications device 10 may communicate with the remote caregiver 38 through a network 36, such as the Internet, which is depicted by a cloud for illustrative purposes only. The communications device 10 may also communicate with the remote caregiver 38 through email via a simple mail transport protocol (SMTP) software program resident on the web server 34 or any other protocol including any or all Internet protocols including FTP or RMCP, (i.e. text messages, telephone calls and the like). The remote caregiver 38 may also communicate with the communications device 10 through the network 36 in order to request information from the communications device 10, program the communications device 10, upload information to compatible system (not shown) present at the remote interested-party location and the like.

Figure 5:
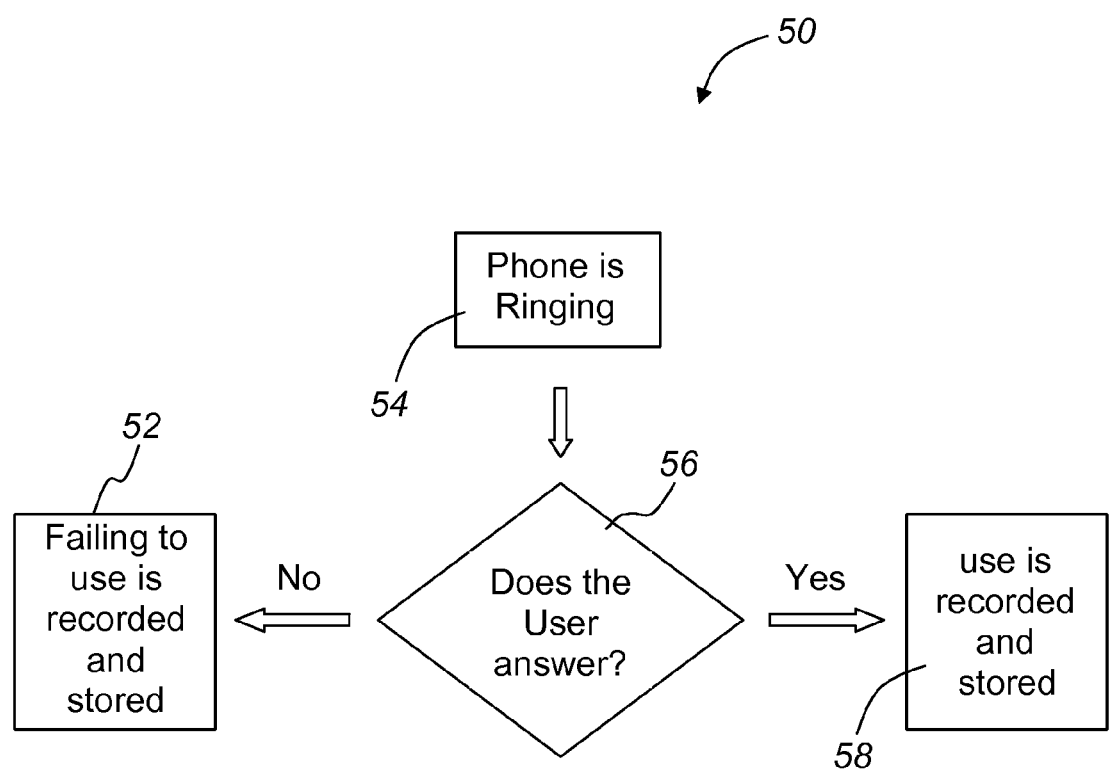
FIG. 5 is a flow chart of a method of monitoring configured according to a first embodiment of the present disclosure.

FIG. 5 illustrates a first method 50 for use of a communications device as configured according to an embodiment of the present disclosure. The method 50 begins with the telephone 24 on the communications device ringing at 54. The communications device then records whether or not the monitored individual answered the telephone 24 at 56. If the monitored individual answers the telephone at 58, then the use of the telephone may be stored in the communications system 10 to be reported to the remote caregiver 38. If the monitored individual does not answer the telephone at 52, then the failure to use the telephone or failure to answer the telephone may be stored in the communications system to be reported to the remote caregiver 38. Additional information concerning telephone calls may be stored by the communications device and reported to the interested-party 38 in various ways. For example, voice level and/or strength of the monitored individual's voice, caller ID information, length of telephone call, and number of rings before the monitored individual answered the telephone call, time from the first ring until the individual answered and the like or even the conversation itself (full or partial). Other activities can also be recorded to be eventually reported to remote interested parties, as requested by caregivers/other interested parties.

Figure 6:
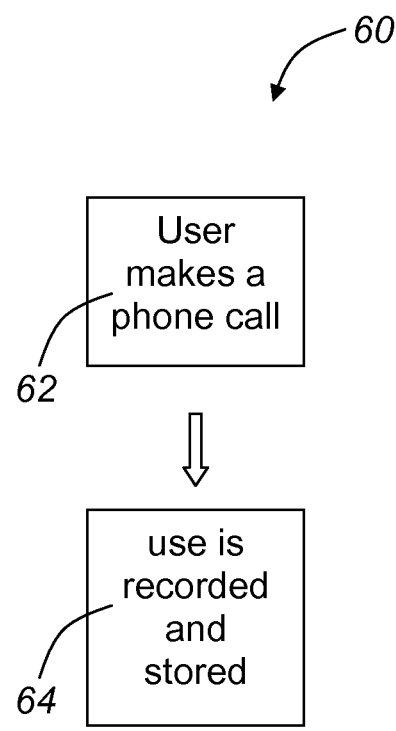
FIG. 6 is a flow chart of a method of monitoring configured according to a second embodiment of the present disclosure.

FIG. 6 illustrates a second method 60 for use of a communications device 10 as configured according to an embodiment of the present disclosure. This method 60 begins with the monitored individual making a telephone call on the communications device 10 at 62. This use of the telephone 24 may be recorded and stored in the communications device 10 by the web server 34 at 64 and reported to the remote caregiver 38 upon request. Additional information concerning the monitored individual telephone call may also be recorded in this method. For example, the length of the telephone conversation, voice strength and/or level of the monitored individual's voice, caller ID information and the like, even the conversation itself, if it was recorded (fully or partially), as a fraud detection and prevention measure, namely to be used to subsequently prove that fraud took place (or not) or that [possibly fraudulent] promises were made (or not) to the elderly unsuspecting individual, a very common scenario.

In general, any activity where the monitored individual interacts (or not) or is expected to interact (or not) with the telephone (such as handset being lifted or put back down, or a key from the keypad or the keyboard being selected) or any accessories working in conjunction with the telephone, is recorded to be eventually reported to interested caregivers, activity in this case refers to any information or interaction with the telephone or a component or peripheral(s) or accessory(ies) working in conjunction with the telephone, or any other event detectable by the telephone.

In practice, both methods would typically be used with the communications device 10. Therefore, any use of the telephone 24 or failure to use the telephone 24 would be recorded on the web server 34 to be reportable to the remote caregiver 38.

Figure 7:
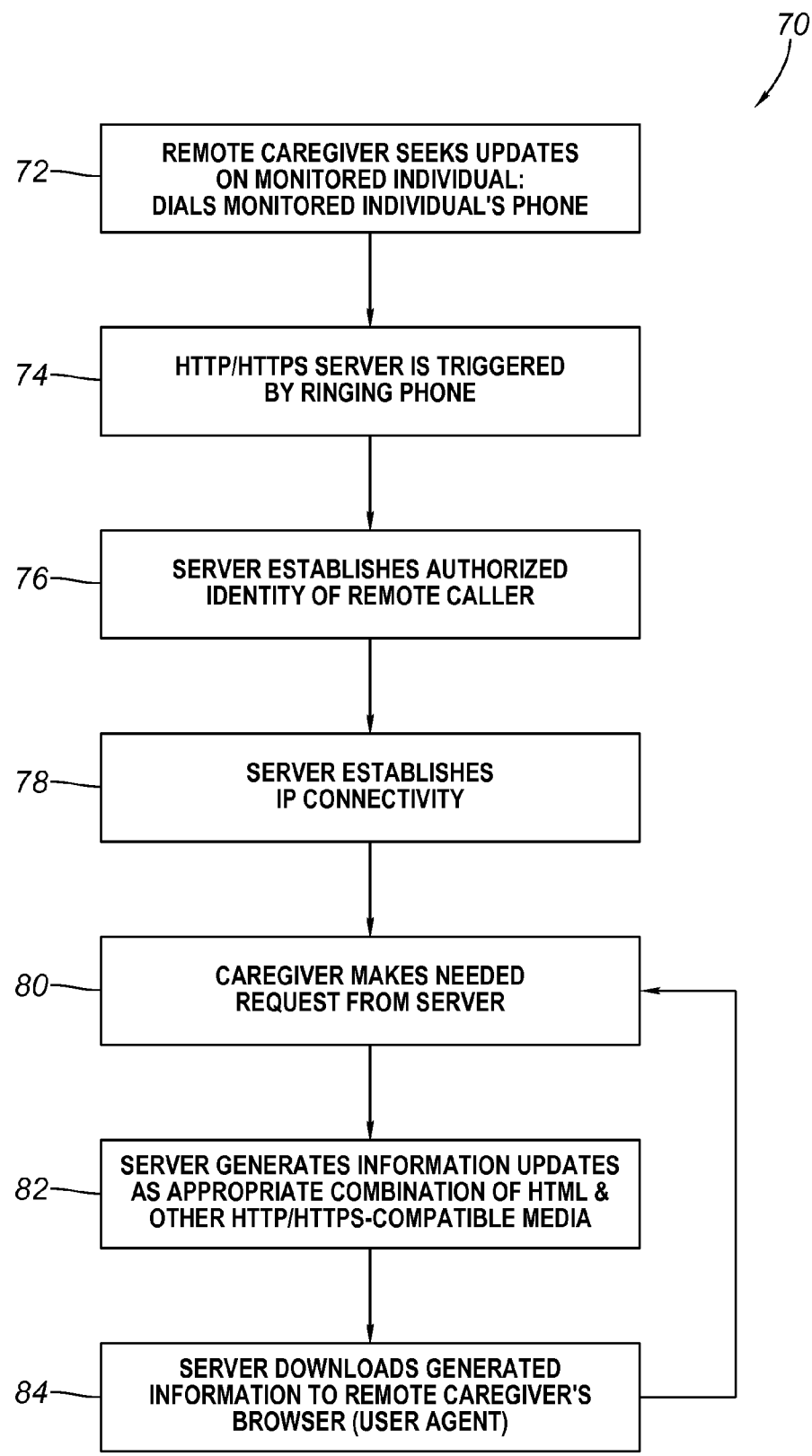
FIG. 7 is a flow chart of a method for a device for monitoring configured according to an embodiment of the present disclosure.

FIG. 7 illustrates how the communications device of FIGS. 1-4 operates the methods of FIGS. 5-6. As illustrated in method 70, the web server 34 of the communications device 10 may be triggered by the ringing of the telephone 24 at 72 of the communications device 10, if the server is not already online (a common scenario in a home where there is not an always-on IP network, such as those homes that do not have broadband access). Once online, the web server 34 of the communications device 10 can now service incoming HTTP/HTTPS requests by serving, as required and requested, various activity reports or other requested information or other status updates on the monitored individual, or updated information to be stored on the server. This information may also be transmitted to the remote interested-party 38 via email, text message, over the telephone, or the like. It may be also possible, that the communications device may be programmed so that instead of notifying the remote caregiver 38 every time the telephone may be used, the remote caregiver 38 may be given a periodic summary of the telephone activity by the server based on its stored information.

In other embodiments of the present disclosure, the communications system 10 may be programmable so that the telephone 24 may sound an alarm play a sound or otherwise notify the monitored individual, such as, for example, rings at a certain time in order to remind the monitored individual of an event or task to be accomplished, such as, for example, to take medication, an appointment, such as, a doctor's appointment, or a TV show to be recorded or watched or the like. Failure by the individual to answer or otherwise interact with the telephone 24 (directly or indirectly via peripherals when this reminder call may be made may be recorded by the web server 34 to be ultimately reported to the remote caregiver 38.

In still other embodiments of the present disclosure, voice recognition may be used to determine whether or not the monitored individual answered the telephone 24 or if it was someone else. Voice recognition may also make it possible for multiple individuals to be monitored by one communications device. The communications device 10 may then determine which individual answered the telephone 24 and may report the activity to the remote caregiver and after recording that information. Voice Recognition can also be used by the monitored individual or caregiver, locally or remotely, to specify commands or otherwise interact with the device.

In some cases, as programmed or otherwise specified by the caregiver on the built-in server, a lack of recorded activity or other caregiver-specified trigger/parameter could initiate proactive actions by the server. Such action can include dialing from a list of numbers and playing back a pre-recorded message or sending out email or text message to caregiver-defined telephone numbers and email addresses or any other server or phone-executable actions or program.

In additional embodiments, the present disclosure may be configured to monitor sounds and or movement or any other device-detectable event within range of the communications device 10 or any of its operatively connected peripherals working in conjunction with the device. In this embodiment, incidents such as a loud scream or a crash or the like may trigger emergency preset protocol in the communications device 10. The communications device 10 may then, for example, call certain predetermined telephone numbers such as 911 or the remote interested-party or perform any other specified web server action. The communications device 10 may also play back a set of recorded instructions to the person that answers the telephone at the predetermined numbers, and even allow for playback of the triggering noise or unusual activity (such as a person asking for help). The recorded instructions may include the monitored individual's address, name and other information that may aid the person on the other end of the line to access the situation and provide aid. The communications device may also allow the monitored individual to talk to the person on the other end of the line and may put the telephone in speaker mode or open a video conference channel for the monitored individual, assuming that the communications device 10 may comprise an appropriate camera, thus enabling 2-way communication.

Computer applications or programs may be written for the built-in server of the communications device 10. Applications may include a calendar and reminder function, video games, video playback, photo viewing, address book and the like, such as a daily prayer recitation, or a weekly recipe or any other application that may have health-related or lifestyle-related value to the monitored individuals or caregivers or any other authorized and interested party such as advertising displays for selected products and services.

In embodiments of the present disclosure, the remote caregiver 38 may access the information stored on the communications device 10 by calling or otherwise connecting to the communications device 10 or its internal Web server. When the telephone number of the remote caregiver 38 appears on the communications device's caller ID or after the caregiver is otherwise recognized and authorized, the communications device 10 may automatically or upon request provide an update of the activity on the telephone 24 or any other requested information or service. A special code or tone may also be used instead of the caller ID to cause the communications device 10 to recognize the remote party (caregiver or remote server) and provide the update or information.

In cases where the built-in server is not already or continuously online (e.g. intermittent network connections when no broadband connections available) the caregiver may also access a secondary server (e.g. via a client browser) that will initiate a special call with tones to the device (or via caller ID recognition) which will then connect itself to the IP network using its modem.

Also, a secondary server can be used to regularly back up the information (e.g. in a proactive push action) on the monitored individual's device to facilitate recovery should the primary device fail. This secondary server may also help caregivers accessing the (slightly out of date) information when the device is not currently or continuously online or capable to be placed online (e.g. while the monitored individual is on the telephone and no separate concurrent network connection is available).

The embodiments and examples set forth herein were presented in order to best explain the present disclosure and its practical applications and to thereby enable those of ordinary skill in the art to make and use the disclosure. However, those of ordinary skill in the art will recognize that the foregoing description and examples have been presented for the purposes of illustration and example only. The description as set forth is not intended to be exhaustive or to limit the disclosure to the precise form disclosed. Many modifications and variations are possible in light of the teachings above without departing from the spirit and scope of the forthcoming claims. Accordingly, any components of the present disclosure indicated in the drawings or herein are given as an example of possible components and not as a limitation.

The invention claimed is:

1. A communications device comprising:
   a telephone having public switched telephone network connectability, the telephone comprising:
   a base unit;
   a handset having a microphone and a speaker operatively positioned therein and being capable of operatively interacting with the base unit;
   a first cord having two ends, the handset being operatively connected to one of the two ends of the first cord and the other of the two ends being operatively connected to the base unit; and
   a second cord having two ends, one end being operatively connectable to the base unit and the other end of the second cord being operatively connectable to a public switched telephone network telephone jack; and
   a web server operatively resident in the telephone wherein the web server further comprises:
   local permanent storage capability for storing information pertaining to the operation of the device or its monitored individual(s), some or all of which can be retracted remotely by remote interested parties, the locally stored information being capable of being backed up to a remote computer or a secondary server to facilitate its recovery if the telephone hardware should fail or otherwise become unusable to the caregiver or the monitored individual, or simply to facilitate retrieval of that information without requiring an explicit connection from the interested parties' browsing client to the monitored individual's telephone's web server when such a connection is not available.

2. The device of claim 1 wherein the web server is capable of being either a hardware implementation or software implementation or a combination thereof.

3. The device of claim 1 wherein the web server contains a minimum capability of handling the HTTP/HTTPS protocol over an appropriate network, and is capable of, minimally, generating HTML or other HTTP/HTTPS-compatible media responses to client-originated HTTP/HTTPS requests.

4. The device of claim 1 wherein the web server further comprises:
   capability to implement other server related protocols and functionality such as the SMTP protocol, for emailing, or the FTP protocol for file transfers.

5. The device of claim 1 wherein the web server functionality of the telephone further comprises:
   local processing capabilities for running software applications.

6. The device of claim 1 wherein the web server is capable of operating in two modes, those being always connected or intermittently connected to an appropriate network.

7. The device of claim 6 wherein the always connected mode applies when the telephone is connected to an always ON network via a RJ-45 LAN port or other port that is always on or a cellular network that supports IP connectivity and is always ON and accessible.

8. The device of claim 6 wherein the intermittently connected mode applies when an always-ON network connection is not available or accessible at any given point in time such as when only PSTN access is available, such intermittent network connectivity can be established proactively by the telephone when a function requires network connectivity or when an interval timer counts down and initiates the connection, or reactively when an explicit, possibly external, trigger is detected, which triggers the web server to go into HTTP/HTTPS service mode, or by explicit tones or any other mechanism by which the remote party indicates for the web server to initiate IP connectivity to the Internet, such calling in can require the current telephone call to be terminated to allow for a subsequent call to be made by the telephone to establish the IP connectivity.

9. The device of claim 6 wherein the web server is reachable from a connected network, either directly through an ongoing established network link or whenever the network link is established, on an intermittent fashion, such connection being triggered;
   A) by a timer or on a schedule or other trigger established by the remote caregiver or other parameter;
   B) explicitly by an external call into the telephone from a specific source, or by a special and detectable sequence of tones generated manually such as by a human remote caregiver or by another server that puts the web server into its connected mode operation.

10. The device of claim 6 operable in push mode.

11. The device of claim 6 operable in pull mode.

12. The device of claim 1, wherein the telephone further comprises:
   an integrated screen operatively connected to the telephone, the integrated screen being operatively connected to the base unit or the handset, and adjustable or moveable or detachable, for a better viewing angle or otherwise configured to work in conjunction with the telephone and the integrated screen being also able to act as an input device.

13. The device of claim 12 wherein the screen is capable of being operatively connected to the base unit by direct wire to the telephone or wirelessly to the telephone.

14. The device of claim 1, wherein the telephone further comprises:
   an operatively connected alphanumeric keyboard.

15. The device of claim 1, wherein the telephone further comprises:
   means to connect to a plurality of communications networks, via appropriate parts selected from the group consisting of modems, ports on the telephone, and RJ-45 ports/jacks for an IP network.

16. The device of claim 15 wherein the first and minimal network connectivity is the PSTN and connectivity can be established via a hardware or software implementation of a modem or other mechanism.

17. The device of claim 15 wherein the network connectivity can include:
cellular networks such as CDMA or GSM network, IP networks such as local area network or the Internet, local wireless networks such as Bluetooth® or Wi-Fi network, or Zigbee®.

18. The device of claim 15 wherein the network connectivity hardware and/or software is operatively positioned in the handset or in the base of the telephone.

19. The device of claim 15 wherein connectivity to a plurality of networks can be established concurrently, such as a telephone call being placed on the PSTN, while IP connectivity is being established concurrently via a LAN port.

20. The communications device of claim 1, wherein the web server is capable of running a plurality of applications concurrently.

21. The device of claim 1, further comprising:
an intermediary remote server connectable either via a network- or other means that is used to backup information from the telephone, in case of device failure and can also be accessed by interested parties to access device data without having to first connect directly to the monitored individual's device for those times when the device is functioning in a non-connected mode or not functioning at all.

22. The device of claim 1, further comprising:
the ability to add additional information explicitly to the telephone's local storage, either directly via local input hardware, or remotely via an established network connection, or locally via a device operatively connected to the telephone.

23. The device of claim 22 wherein additional and explicit information can relate to the individual itself, or lifestyle related information including cooking recipes, pictures or videos of grand-children, daily prayers, or any other information not related to the individual.

24. The device of claim 1, further comprising:
access ports and connectors for external peripherals selected from the group consisting of USB Thumb drives, temperature controls and humidity controls.

25. The communications device of claim 1, further comprising:
at least one access slot for interacting with external peripherals or accessories or storage or encryption peripherals.

26. The device of claim 25, wherein the stored information is capable of being transported from the telephone to another telephone, device, or compatible computer such as when visiting a doctor to relate weekly or monthly status reports.

27. The device of claim 25 wherein the smartcards or other peripheral device's information can be accessed either with physical contact with the telephone such as via a built-in slot reader/writer for smartcards, or wirelessly for those devices that support wireless capability or over appropriate wireless (such as cellular or cordless) or wired network.

28. The device of claim 1, further comprising:
a hardware or software implementation of a telephone answering service with optional call routing or auto-attendant or call distribution, with programmable menu or tone based functionality or voice actuated functionality.

29. The device of claim 1, further comprising:
built-in capability to convert analog conversations, whether initiated at the telephone or in response to incoming calls, or otherwise activated and captured, such as via an operatively connected microphone or camera, to digital signals in order to use VoIP technologies and protocols to conduct voice or video calls over appropriate networks.

30. The device of claim 1 wherein the handset is not physically connected to the base unit but is working in conjunction with the telephone.

31. The device of claim 1 wherein the base unit further comprises:
a speaker, or plurality of speakers, operatively associated therewith; and
a microphone operatively associated therewith.

32. The device of claim 1 wherein the PSTN functionality still works even in the event of a power failure.

33. A communications system for remotely monitoring a monitored individual, the system comprising:
a communications device comprising:
a telephone, having a base unit and a handset, capable of recording direct or indirect interactions or activity and having a web server operatively positioned in the base unit or in the handset; and
wherein the telephone is capable of monitoring for interactions or activity, and wherein when the telephone detects direct or indirect interaction or activity, the web server records the interaction or activity, and wherein thereafter the web server is capable of reporting such recorded activity to interested and authorized parties.

34. The communications system of claim 33, wherein the web server is capable of being programmed to ring the enclosing telephone, or otherwise notify the monitored individual as a reminder to perform some action, such as taking some medication or going grocery shopping or to keep an appointment or another activity or notify remote interested parties that some activity did not occur as specified.

35. The communications system of claim 34 wherein the web server is capable of recording, fully or partially, any or all incoming and outgoing telephone conversations in order to play them back, on demand by a remote caregiver in order to prevent fraud or as proof of conversation having taken place.

36. The communications system of claim 34, wherein the web server further comprises:
voice recognition software operatively programmed on the web server for identifying individuals utilizing the telephone, locally or remotely, and acting or reacting on voice commands or sounds from these individuals.

37. The communications system of claim 34, wherein the web server is capable of running a plurality of applications including health related as well as non-health related applications such as text messaging, emailing, send and receive, recording of conversations for later review by remote interested parties.

38. A method for monitoring a monitored individual comprising:
providing a communications system including a telephone capable of sounding a plurality of rings and/or tones, and/or other recorded sounds and/or voices and or generated messages; and a web server, operatively connected to the communications system, the web server having the capability of recording the plurality of rings and/or tones, and or other recorded sounds and/or voices and or generated messages; and
reporting a frequency of failing to use the telephone, directly or indirectly, for any purpose by the monitored individual.

39. The method of claim 38, further comprising:
reporting a number of rings required for the monitored individual to answer the telephone, or other detectable parameters (directly or indirectly, and detected or not detected) to a caregiver.

40. The method of claim 38, further comprising:
recording whether the frequency of failing to use the telephone has increased in comparison to other failure to use data stored on the web server or as programmed by an administrator.

41. The method of claim 38, further comprising:
if the monitored individual has failed to use the telephone for a predetermined amount of time, or other lack of activity triggers, or other abnormal activity such as a loud sound or thump in the middle of the night, the communications system is capable of notifying one or more interested party including (but not limited to) a remote caregiver, and/or the monitored individual's personal doctor and/or an emergency response unit of such failure, lack of activity or other specified abnormal detectable event, or perform other pre-specified actions.

42. The method of claim 38, further comprising:
recording an amount of time for each use of the telephone.

43. A communications device comprising:
a telephone having public switched telephone network connectability, the telephone comprising:
a base unit;
a handset having a microphone and a speaker operatively positioned therein and being capable of operatively interacting with the base unit;
a first cord having two ends, the handset being operatively connected to one of the two ends of the first cord and the other of the two ends being operatively connected to the base unit; and
a second cord having two ends, one end being operatively connectable to the base unit and the other end of the second cord being operatively connectable to a public switched telephone network telephone jack; and
a web server operatively resident in the telephone wherein the web server is capable of operating in two modes, those being always connected or intermittently connected to an appropriate network, wherein the intermittently connected mode applies when an always-ON network connection is not available or accessible at any given point in time such as when only PSTN access is available, such intermittent network connectivity can be established proactively by the telephone when a function requires network connectivity or when an interval timer counts down and initiates the connection, or reactively when an explicit, possibly external, trigger is detected, which triggers the web server to go into HTTP/HTTPS service mode, or by explicit tones or any other mechanism by which the remote party indicates for the web server to initiate IP connectivity to the Internet, such calling in can require the current telephone call to be terminated to allow for a subsequent call to be made by the telephone to establish the IP connectivity.

44. A communications device comprising:
a telephone having public switched telephone network connectability, the telephone comprising:
a base unit;
a handset having a microphone and a speaker operatively positioned therein and being capable of operatively interacting with the base unit;
a first cord having two ends, the handset being operatively connected to one of the two ends of the first cord and the other of the two ends being operatively connected to the base unit; and
a second cord having two ends, one end being operatively connectable to the base unit and the other end of the second cord being operatively connectable to a public switched telephone network telephone jack; and
a web server operatively resident in the telephone wherein the web server is capable of operating in two modes, those being always connected or intermittently connected to an appropriate network, wherein the web server is reachable from a connected network, either directly through an ongoing established network link or whenever the network link is established, on an intermittent fashion, such connection being triggered:
A) by a timer or on a schedule or other trigger established by the remote caregiver or other parameter; or
B) explicitly by an external call into the telephone from a specific source or by a special and detectable sequence of tones generated manually such as by a human remote caregiver or by another server that puts the web server into its connected mode operation.

45. A communications device comprising:
a telephone having public switched telephone network connectability, the telephone comprising:
a base unit;
a handset having a microphone and a speaker operatively positioned therein and being capable of operatively interacting with the base unit;
a first cord having two ends, the handset being operatively connected to one of the two ends of the first cord and the other of the two ends being operatively connected to the base unit; and
a second cord having two ends, one end being operatively connectable to the base unit and the other end of the second cord being operatively connectable to a public switched telephone network telephone jack;
a web server operatively resident in the telephone wherein the web server is capable of operating in two modes, those being always connected or intermittently connected to an appropriate network; and
an intermediary remote server connectable either via a network, such as the Internet, or other means, such as directly via PSTN, that is used to backup information from the telephone, in case of device failure and can also be accessed by interested parties, such as remote caregivers, to access device data without having to first connect directly to the monitored individual's device for those times when the device is functioning in a non-connected mode or not functioning at all.

46. A communications system for remotely monitoring a monitored individual, the system comprising:
a communications device comprising:
a telephone, having a base unit and a handset, capable of recording direct or indirect interactions or activity and having a web server operatively positioned in the base unit or in the handset; and
when the telephone detects direct or indirect interaction or activity, the web server records the interaction or activity or the lack there of thereafter the web server is capable of reporting such recorded activity to interested and authorized parties, wherein the web server is capable of being programmed to ring the enclosing telephone, or otherwise notify the monitored individual as a reminder to perform some action, such as taking some medication or going grocery shopping or to keep an appointment or another activity or notify remote interested parties that some activity did not occur as specified.

47. A communications system for remotely monitoring a monitored individual, the system comprising:
- a communications device comprising:
- a telephone, having a base unit and a handset, capable of recording direct or indirect interactions or activity and having a web server operatively positioned in the base unit or in the handset; and
- when the telephone detects direct or indirect interaction or activity, the web server records the interaction or activity or the lack there of thereafter the web server is capable of reporting such recorded activity to interested and authorized parties;
- wherein the telephone is configured to report a frequency of failing to use the telephone, directly or indirectly, for any purpose by the monitored individual.

* * * * *